(12) United States Patent
Schreiber et al.

(10) Patent No.: US 7,327,841 B2
(45) Date of Patent: Feb. 5, 2008

(54) SAR OPTIMIZED RECEPTACLE FOR MOBILE DEVICES

(75) Inventors: Michael Schreiber, Goeggenhofen (DE); Peter Nevermann, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 629 days.

(21) Appl. No.: 10/438,369

(22) Filed: May 13, 2003

(65) Prior Publication Data
US 2004/0226836 A1 Nov. 18, 2004

(51) Int. Cl.
*H04M 9/00* (2006.01)
*H04M 1/00* (2006.01)

(52) U.S. Cl. .................... 379/446; 379/437; 379/451

(58) Field of Classification Search ........... 379/446, 379/449–450, 430, 440, 454–455, 128; 455/575.1, 455/575.4, 575.5, 525.6, 575.8, 90.3; 174/35
See application file for complete search history.

(56) References Cited

U.S. PATENT DOCUMENTS

| | | | | |
|---|---|---|---|---|
| 4,771,927 A * | 9/1988 | Ventura | ............ | 224/666 |
| 5,338,896 A * | 8/1994 | Danforth | ............ | 174/380 |
| 5,444,866 A * | 8/1995 | Cykiert | ............ | 455/575.5 |
| 5,535,439 A * | 7/1996 | Katz | ............ | 455/117 |
| 5,610,979 A * | 3/1997 | Yu | ............ | 379/455 |
| 5,726,383 A * | 3/1998 | Geller et al. | ............ | 174/380 |
| 5,777,261 A * | 7/1998 | Katz | ............ | 174/380 |
| 5,787,168 A * | 7/1998 | Lien | ............ | 379/455 |
| 5,897,040 A * | 4/1999 | Ward | ............ | 224/413 |
| 5,918,189 A * | 6/1999 | Kivela | ............ | 455/575.1 |
| 5,995,854 A * | 11/1999 | Wilson | ............ | 455/575.5 |
| 6,058,185 A * | 5/2000 | Alanara | ............ | 379/446 |
| 6,341,217 B1 * | 1/2002 | Wong | ............ | 455/575.5 |
| 6,374,090 B1 * | 4/2002 | Morales | ............ | 455/90.1 |
| 6,448,490 B1 * | 9/2002 | Katz | ............ | 174/377 |
| 6,615,026 B1 * | 9/2003 | Wong | ............ | 455/575.5 |
| 6,711,387 B1 * | 3/2004 | Lungley | ............ | 455/90.3 |
| 6,785,566 B1 * | 8/2004 | Irizarry | ............ | 455/575.8 |
| 2003/0040286 A1 * | 2/2003 | Walter | ............ | 455/90 |

FOREIGN PATENT DOCUMENTS

JP 2000-101338 4/2000

OTHER PUBLICATIONS

Electromagnetic Compatibility 1999, 13th International Zurich Symposium and Technical Exhibition on Electromagnetic Compatibility Feb. 16-18, 1999, 5 pages total.

* cited by examiner

*Primary Examiner*—Curtis Kuntz
*Assistant Examiner*—Phylesha L Dabney

(57) ABSTRACT

A holder for a mobile communication device comprises a receptacle for optimally reducing the SAR value of a mobile communication device secured within the receptacle. At least one material portion, a patch, causing electromagnetic losses may be placed within the receptacle to optimally reduce exposure to low level radio frequency energy to an individual carrying a mobile telephone secured within the receptacle. The patch formed of electromagnetic field reducing material may be placed in one or more particular areas of the receptacle to attenuate one or more corresponding regions of the mobile telephone in which the SAR value is substantially at a local maximum. This may allow a reduction of the SAR value of a mobile telephone while limiting the performance loss associated with the reduction of the SAR value of the mobile telephone when the mobile telephone is secured within the receptacle.

25 Claims, 10 Drawing Sheets

SAR OPTIMIZED RECEPTACLE FOR MOBILE DEVICES

BACKGROUND OF THE INVENTION

The present invention relates generally to mobile communication devices such as mobile telephones and the like, and more specifically to a holder for a mobile communication device, in particular, a mobile telephone, having a receptacle capable of reducing the Specific Absorption Rate (SAR) of the mobile communication device.

It is known that exposure to very high levels of radio frequency electromagnetic energy, particularly at microwave frequencies, can heat biological tissue causing harm by increasing body temperature, disrupting behavior, and damaging biological tissue. Consequently, the effect of low levels of radio frequency energy, such as produced by mobile telephones, on human tissue has also come under intense scientific investigation. While there is no scientific proof that the relatively low levels of radio frequency energy produced by mobile telephones can cause damage to human tissue, many governmental bodies, such as the United States Federal Communication Commission (FCC) and many European regulatory organizations, have nevertheless imposed precautionary regulations and measurement guidelines aimed at limiting the exposure of users to such energy.

Accordingly, methods and systems of reducing exposure to low level radio frequency energy for mobile telephones have been developed. Specific absorption rate (SAR) is a widely accepted measurement of radio frequency energy absorbed into the body in watts per kilogram (W/kg) averaged over a certain amount of tissue when the telephone is situated close to the human body.

Existing concepts used for reducing the SAR value of a mobile telephone are based on three ideas: adding reflective shielding to the mobile telephone, creating distance between the antenna of the telephone and the human body, and reducing the radiated power of the telephone through incorporation of absorbing materials within the telephone's housing. A problem associated with reducing the SAR value of a mobile telephone is mostly a parallel reduction in performance of the mobile telephone. For example, absorbing devices reduce the available radiated energy of the telephone but limit the area in which the mobile telephone may be used (i.e., reduce the coverage area of the telephone).

As consumers' reliance upon mobile and cellular communication has increased, individuals regularly carry mobile telephones on their bodies by use of a mobile telephone holder having a receptacle such as a pouch, case, or holster. A benefit of a mobile telephone receptacle is the reduction of SAR value of the mobile telephone when secured within the mobile telephone receptacle. However, mobile telephone receptacles known to the art are of a homogeneous material, and radiating elements of the mobile telephone are thus attenuated equally. A drawback associated with equally attenuating the radiating elements of a mobile telephone is the unnecessary reduction in performance of the telephone.

Consequently, there is a general need for a mobile telephone holder having a receptacle for reducing the SAR value of a mobile telephone secured within the receptacle, while limiting the performance loss of the mobile telephone associated with the reduction of the SAR value of the mobile telephone.

SUMMARY OF THE INVENTION

Accordingly, the present invention is directed to a holder for a mobile communication device having a receptacle capable of optimally reducing the SAR value of the mobile communication device secured within the receptacle. In an embodiment of the invention, at least one material portion, hereinafter referred to as a patch, causing electromagnetic losses may be placed within a mobile communication device receptacle to optimally reduce exposure to low level radio frequency energy to an individual carrying a mobile communication device secured within the receptacle.

Advantageously, the patch formed of electromagnetic field reducing material may be placed in one or more particular areas of the receptacle to attenuate one or more corresponding regions of the mobile telephone in which the SAR value is substantially at a maximum. As a result, the patch of the mobile communication device receptacle may be in proximity to the region of substantially maximum elevated electromagnetic radiation and may effectively attenuate areas of high electromagnetic field strength or "hot spots" of the mobile communication device when the mobile communication device is placed within the receptacle. By limiting the patch to one or more particular areas of the receptacle, a mobile communication device may operate at an optimal level while the SAR value of the mobile communication device is reduced.

It is to be understood that both the foregoing general description and the following detailed description are exemplary and explanatory only and are not necessarily restrictive of the invention claimed. The accompanying drawings, which are incorporated in and constitute a part of the specification, illustrate an embodiment of the invention and together with the general description, serve to explain the principles of the invention.

DETAILED DESCRIPTION OF THE SPECIFIC EMBODIMENTS

Reference will now be made in detail to the presently preferred embodiments of the invention, examples of which are illustrated in the accompanying drawings.

Referring generally now to FIGS. 1 through 13, exemplary embodiments of mobile communication device holders are shown, including embodiments wherein the holder's receptacle is a pouch, case and holster. It is contemplated that the mobile communication receptacle device of the present invention may be suitable for mobile telephones. However, other types of mobile communication devices (e.g., pagers, wireless equipped palmtop computers or personal digital assistants (PDA), or the like) may be utilized in accordance with the present invention.

One or more regions of a mobile telephone may produce areas of substantially maximum elevated electromagnetic radiation (i.e., areas of locally higher field strength) compared to other areas of the mobile telephone. These are hereinafter referred to as regions of substantially maximum elevated electromagnetic radiation. Consequently, the SAR value of a mobile communication device is at an elevated or substantially maximum level in these regions. Elevated SAR value regions may be detected by performing an H-field distribution analysis as shown in FIGS. 5-9.

The receptacle of a mobile communication device holder of the present invention may include at least one patch, formed of electromagnetic field reducing material, in one or more areas corresponding to one or more regions of substantially maximum elevated electromagnetic radiation of a mobile communication device (e.g., a mobile telephone) received in the receptacle. The one or more patches of electromagnetic field reducing material incorporated within the mobile communication device receptacle may effectively attenuate the high electromagnetic field regions of a mobile telephone. In an advantageous aspect of the present invention, the overall SAR value of the mobile telephone may be reduced by the receptacle without causing a significant performance reduction of the mobile telephone.

It is contemplated that various descriptions of patches of the invention, including placement, type, thickness and the like while described with one particular embodiment of a mobile communication device receptacle may also be implemented in any type of mobile communication receptacle device, even though it may not be specifically described with each embodiment of mobile communication device receptacles.

Figure 1:
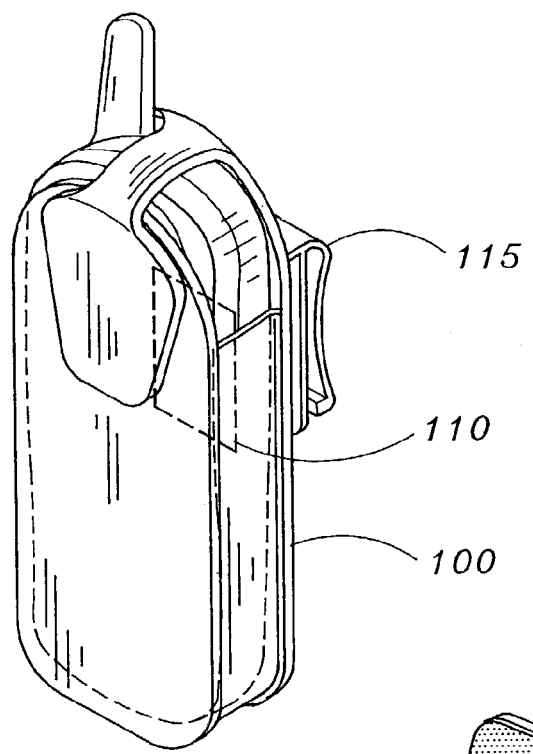
FIG. 1 is an illustration depicting an embodiment of a pouch for securing a first type of mobile telephone, where the pouch includes a patch.
Figure 2:
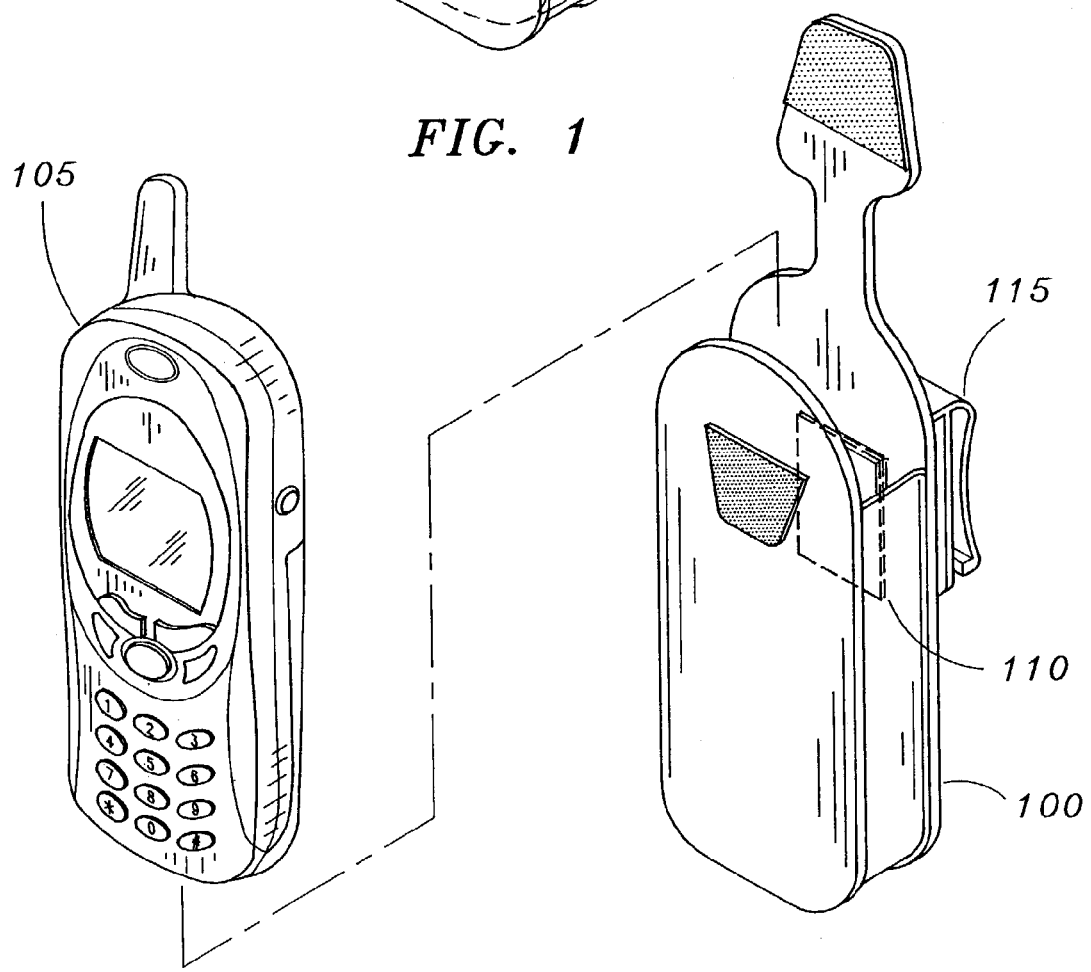
FIG. 2 is an illustration depicting an exploded view of an embodiment of a pouch of the present invention.

Referring to FIGS. 1 and 2, illustrations depicting an embodiment of a holder comprising a pouch 100 for securing a mobile telephone 105, where the pouch 100 includes a single patch 110 are shown. A pouch 100 may refer to a type of mobile telephone receptacle that may store the mobile telephone during non-use of the mobile telephone. A pouch 100 may provide removable storage for a mobile telephone 105 whereby the pouch 100 may substantially enclose the mobile telephone when the mobile telephone is placed within the pouch 100. A pouch 100 may include a clip 115 and may be worn on clothing (e.g., a belt) of an individual for temporarily carrying the mobile telephone. Additionally, a pouch 100 may also be suitable for use of a mobile telephone in conjunction with a headset. When the pouch 100 is secured to clothing of an individual, typically around the waist of an individual, a mobile telephone secured within the pouch may produce high SAR values.

Patch 110 may effectively attenuate a region of a mobile telephone with a high SAR value. Attenuation may refer to the reduction of electromagnetic radiation being absorbed by an individual when a mobile communication device is in proximity to a user's person. Patch 110 may be formed of electromagnetic field reducing material such as electromagnetic field absorbing material or electromagnetic field reflecting material. Electromagnetic absorbing material may include dielectric, metallic, magnetic and other materials (such as ferrites) causing electromagnetic losses. The specific type of material utilized in a patch 110 may be dependent upon the amount of electromagnetic energy radiated by a mobile telephone. Patch 110 may comprise a variable amount of thickness depending upon the amount of attenuation desired. For example, in an extremely high radiating mobile telephone, a thick metallic patch may be incorporated within the pouch 100. In an embodiment of the invention, patch 110 may be permanently incorporated within the pouch 100. In an alternative embodiment, patch 110 may be removably inserted within the pouch 100.

To achieve optimal SAR value reduction while allowing good antenna performance of the mobile telephone 105, patch 110 may be placed in an area corresponding to a region in which the SAR value of the mobile telephone is at an elevated or substantially maximum level with respect to its surrounding region. For example, if a particular region of a mobile telephone in which the SAR value is at a relative local maximum is on a front side of a telephone near a corner in which an antenna protrudes, then a patch 110 may be placed within the receptacle in a potentially corresponding area or areas (dependent on which way the phone is placed in the receptacle). Thus, when the mobile telephone is secured within the receptacle 100, the patch 110 is in proximity to the region of substantially maximum elevated electromagnetic radiation and effectively covers the region of the mobile telephone. Advantageously, attenuation of one or more hot spots may effectively reduce the SAR value of the mobile telephone.

Figure 3:
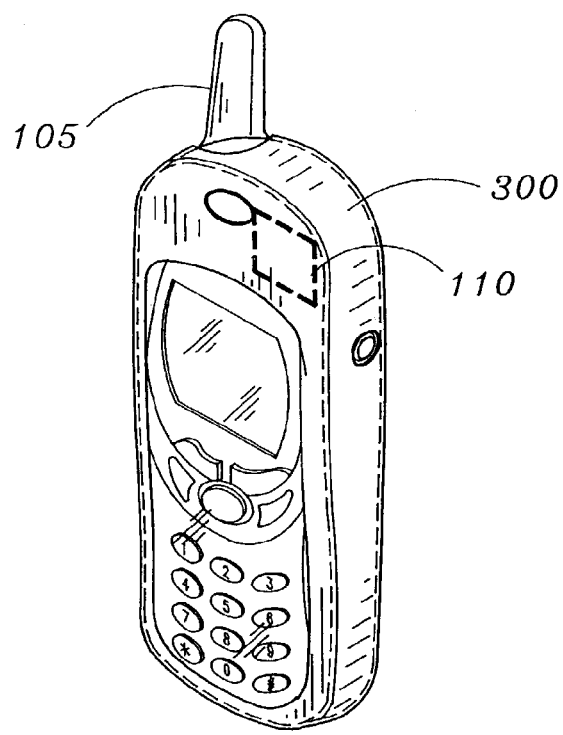
FIG. 3 is an illustration depicting an embodiment of a case for removably securing a first type of mobile telephone, where the case includes a patch.
Figure 4:
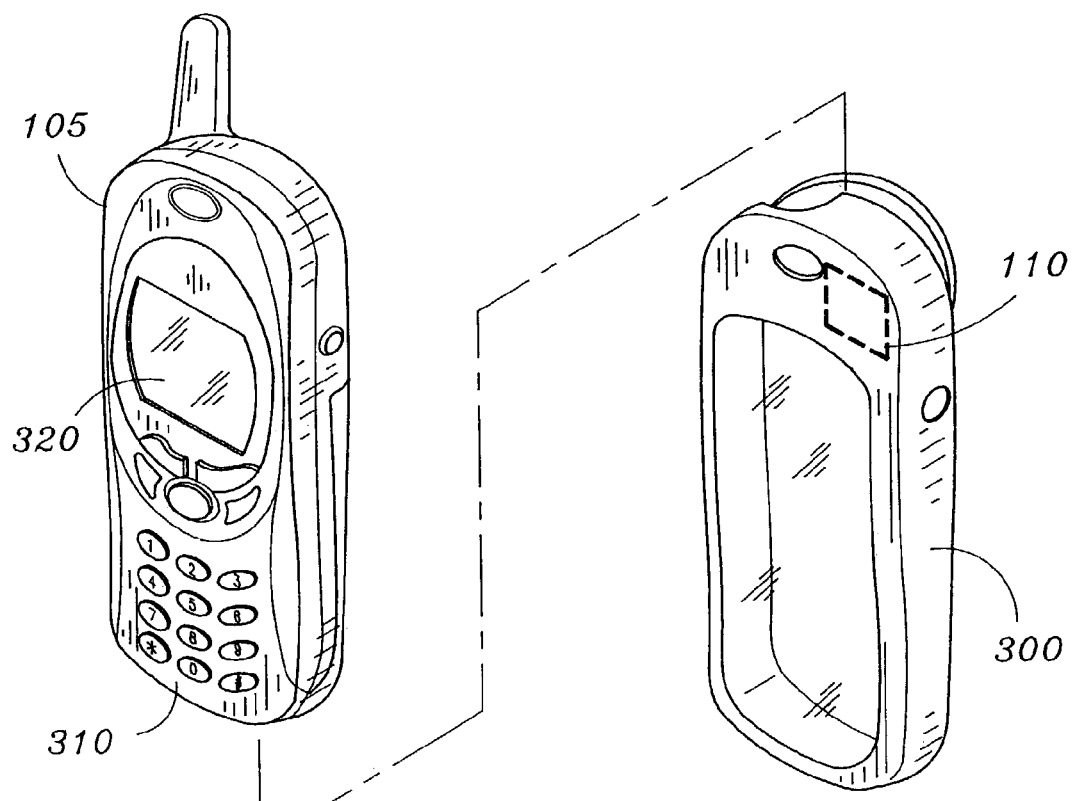
FIG. 4 is an illustration depicting an exploded view of an embodiment of a case of the present invention.

Referring to FIGS. 3 and 4, illustrations depicting an embodiment of a holder comprising a case 300 for removably securing a mobile telephone 105 (e.g., via Velcro tabs or a snap or other attaching mechanism on the case 300). The case 300 includes a single patch 110 in the embodiment shown. A case 300 is another type of mobile telephone receptacle in which, during normal operation, the mobile telephone 105 can be secured. The case receptacle 300 of the specific embodiment also desirably can be removed in situations where during normal operation the user of the mobile device desires to utilize the maximum unattenuated signal strength of the device to establish the wireless communication connection. In such a fashion, case 300 may operate as a protective shield for the mobile telephone 105 and may prevent exterior damage to the housing of the mobile telephone 105. Case 300 may substantially enclose a mobile telephone 105 while providing access to the keypad 310 and display 320 of the mobile telephone 105. For example, case 300 may be constructed from leather and have a transparent or translucent plastic front to allow visibility and input to the keypad 310.

Typically, the case 300 may include a removable or permanent clip (not shown) that may attach to clothing of an individual. This may allow, and may further encourage, body worn operation of the mobile telephone 105. Similar to the discussion of the pouch 100 of FIGS. 1 and 2, case 300 may include a patch 110 formed of electromagnetic field reducing material that may effectively attenuate a region of a mobile telephone with a high SAR value.

Figure 5:
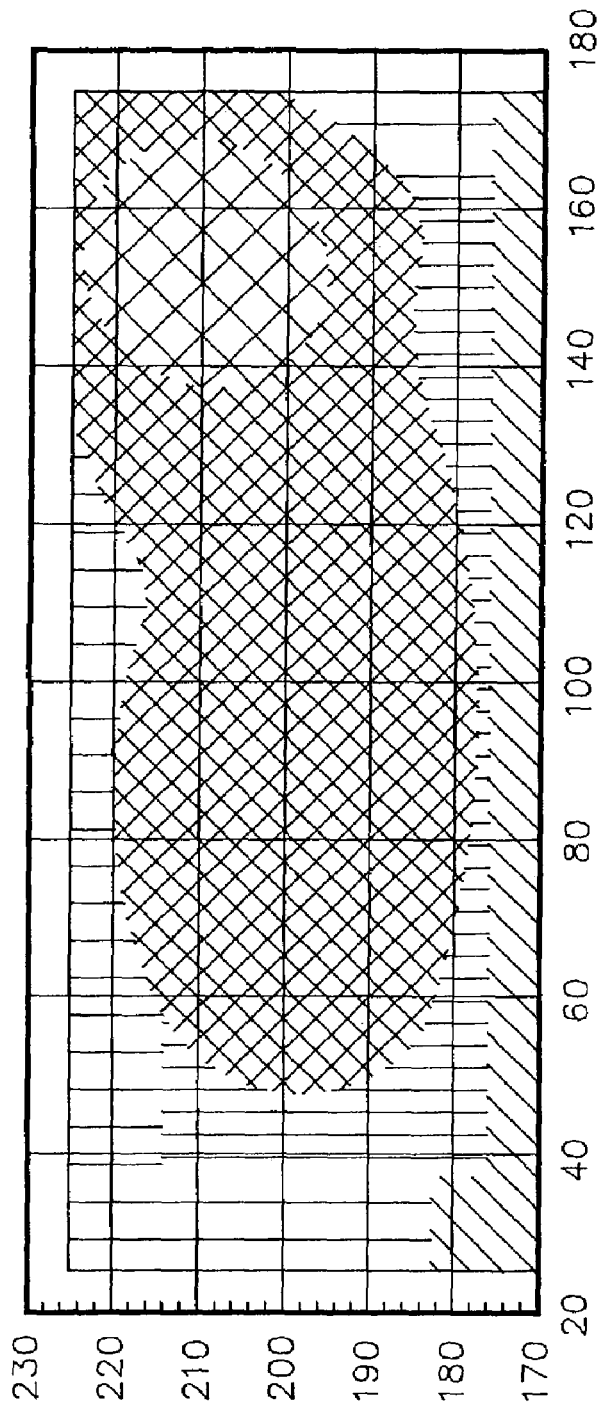
FIG. 5 is an illustration depicting an embodiment of a SAR scan of a first type of mobile telephone representing typical electromagnetic field caused by the mobile telephone during body worn operation.
Figure 5:
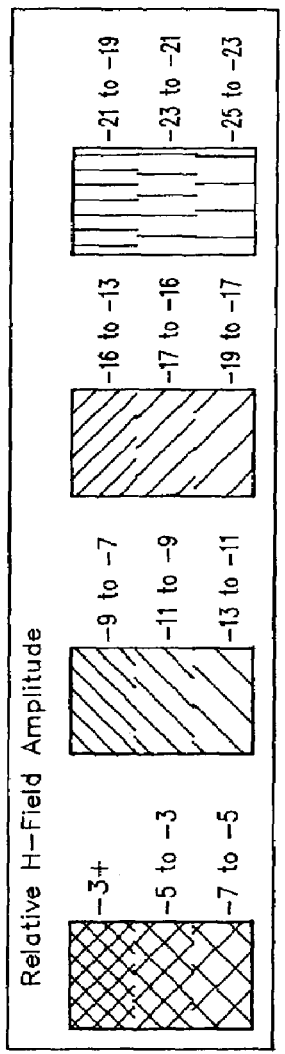

Referring to FIG. 5, an illustration is shown depicting an embodiment of a SAR scan 500 of a mobile telephone representing typical electromagnetic field caused by the mobile telephone during body worn operation. The measurement may represent a typical situation for body worn operation and may be utilized as a procedure to evaluate SAR values of mobile telephones for body worn operation. In this example, there is at least one area of the mobile telephone where a region of substantially maximum elevated electromagnetic radiation is present. Thus, to reduce the SAR value of such a mobile telephone, the one or more regions of substantially maximum elevated electromagnetic radiation may be attenuated by one or more patches incorporated within a receptacle of the present invention.

Figure 6:
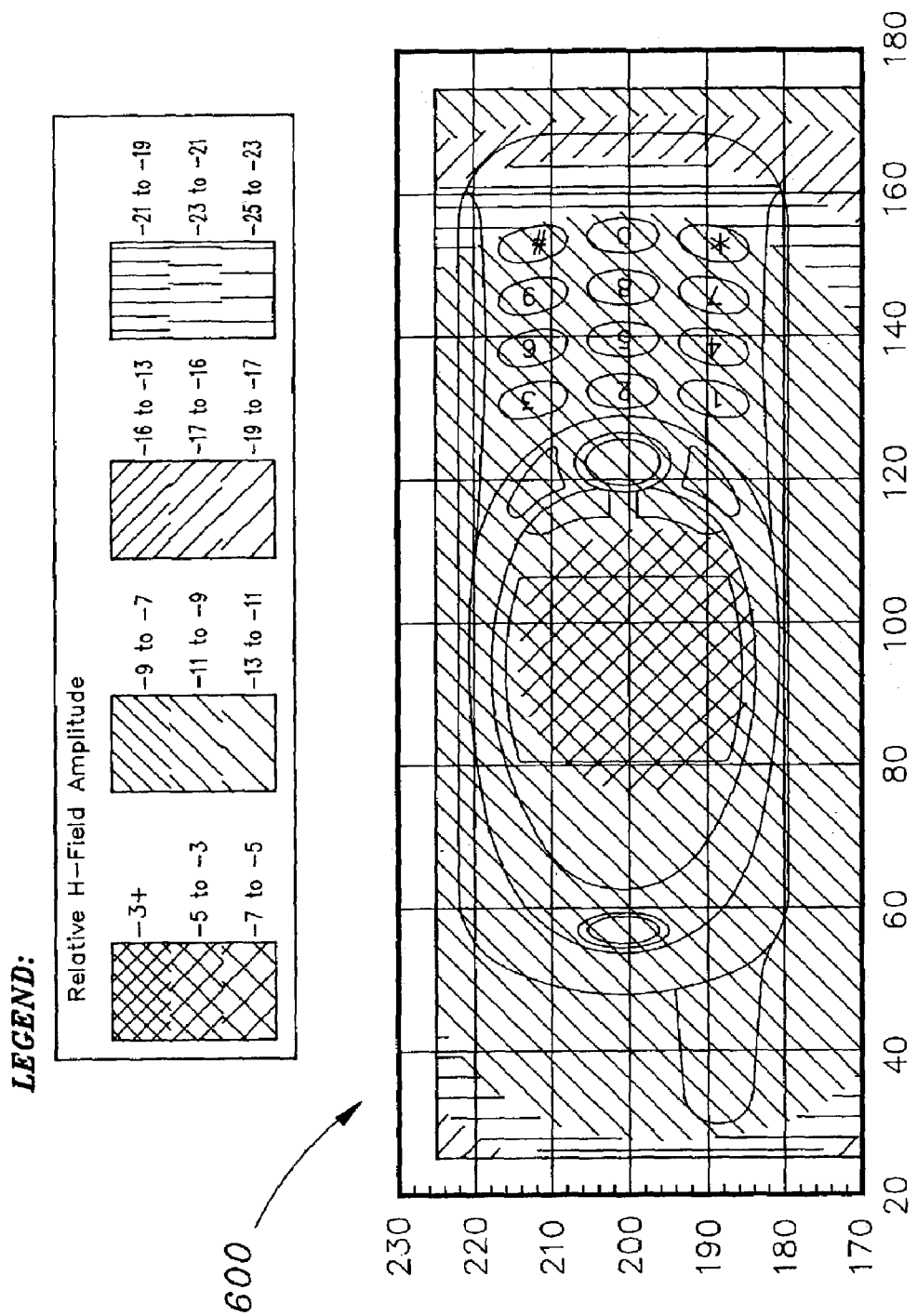
FIG. 6 is an illustration depicting an embodiment of the H-field distribution of a first type of mobile telephone operating at about 900 MHz.
Figure 7:
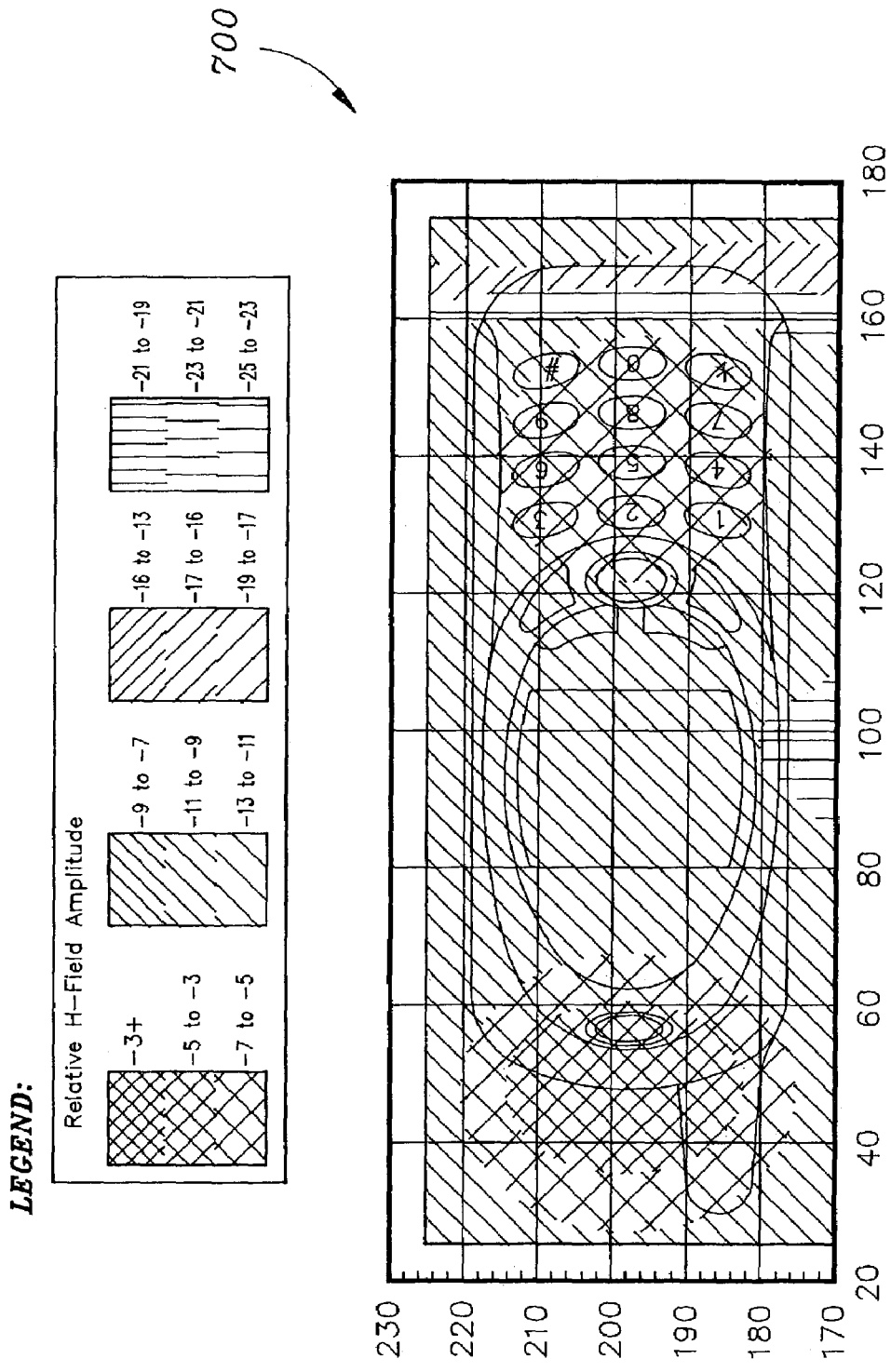
FIG. 7 is an illustration depicting an embodiment of the H-field distribution of a first type of mobile telephone operating at about 1900 MHz.
Figure 8:
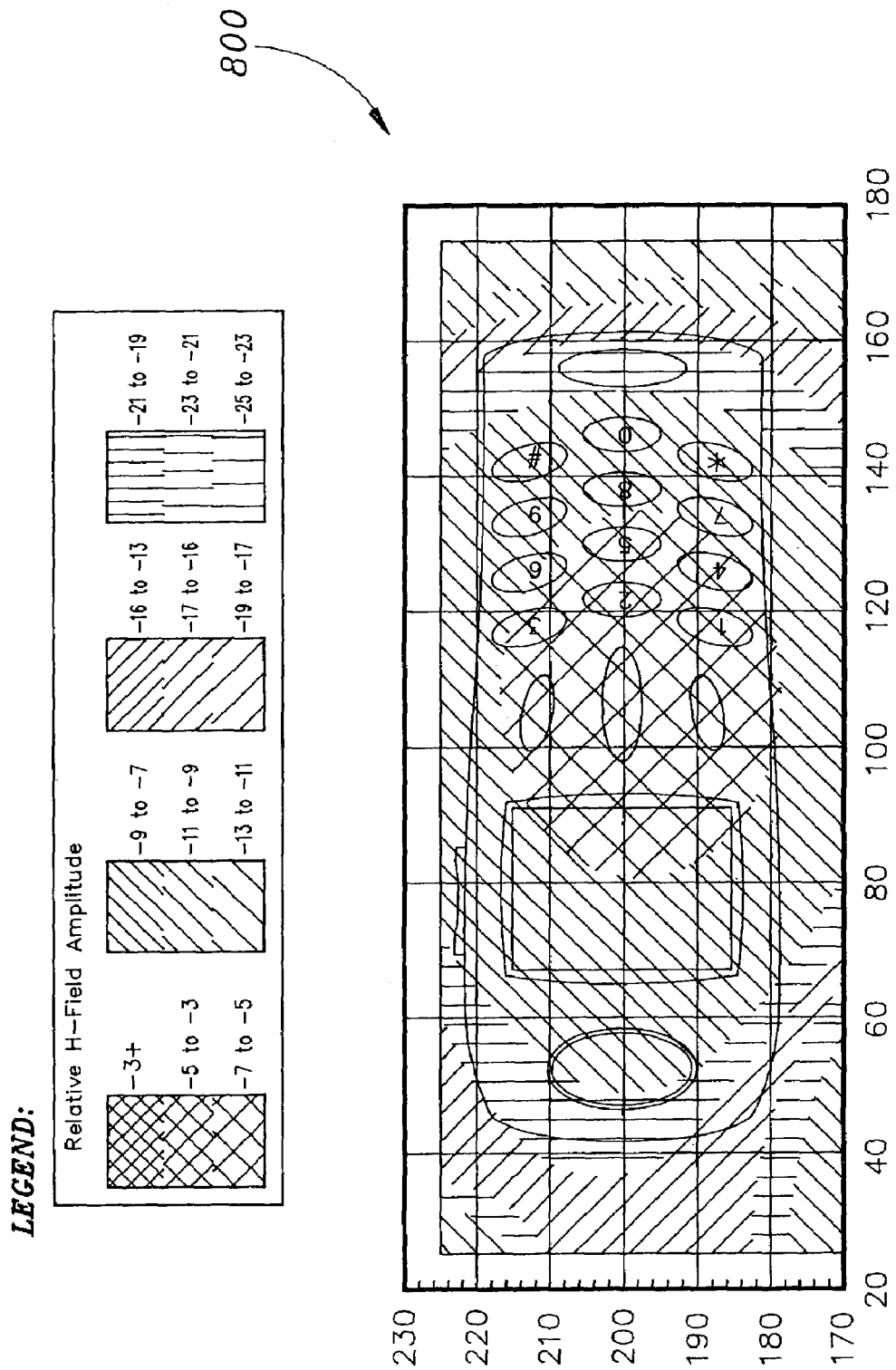
FIG. 8 is an illustration depicting an embodiment of the H-field distribution of a second type of mobile telephone operating at about 900 MHz.
Figure 9:
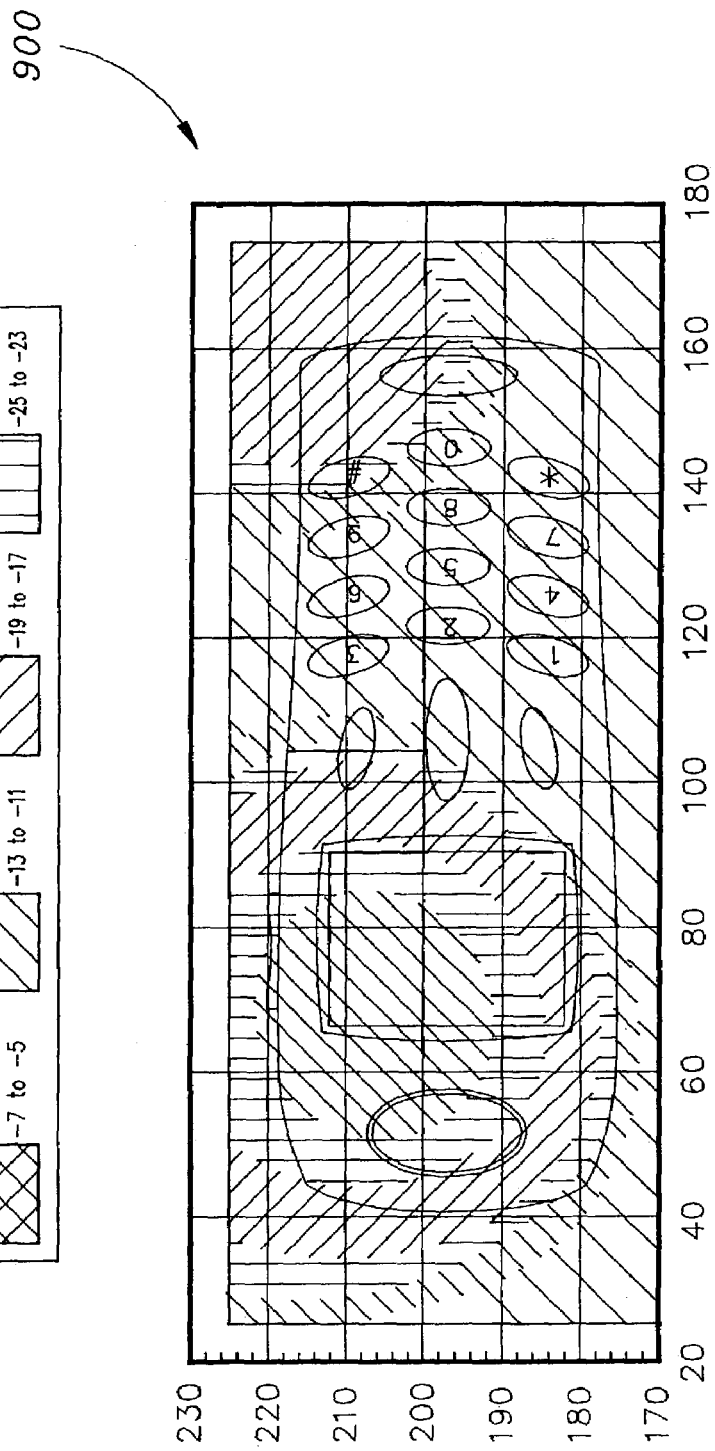
FIG. 9 is an illustration depicting an embodiment of the H-field distribution of a second type of mobile telephone operating at about 1900 MHz.

Referring to FIG. 6, an illustration depicting an embodiment of the H-field distribution 600 of a first type of mobile telephone operating at about 900 MHz is shown. The H-field distribution 600 is taken approximately one (1) centimeter above the front of a mobile telephone. Additionally, the distributions of FIGS. 7-9 are also taken approximately one (1) centimeter above the front of a mobile telephone. The H-field may act as a basic coupling element for energy absorption in the human body (SAR). Thus, the H-field distribution 600 may be representative of regions of a first type of mobile telephone in which the SAR value may be at an elevated or substantially maximum level (relative to the respective local regions). For example, the region of the first type of mobile telephone in which the SAR value may be a maximum may be at the middle of the mobile telephone on the front side of the mobile telephone by the display.

FIG. 7 is an illustration depicting an embodiment of the H-field distribution 700 of a first type of mobile telephone operating at about 1900 MHz. The H-field distribution 700 is slightly different than the H-field distribution 600 of FIG. 6. The distributions of the H-field may depend on the frequency band, antenna type, mobile telephone size, and mobile telephone design. As a result, different types of mobile telephones may have different regions in which the SAR value may be at a substantially maximum level relative to the particular region. Therefore, a receptacle of the present invention may include one or more patches formed of electromagnetic field reducing material in an area(s) of the receptacle corresponding to a region(s) of the mobile telephone in which the SAR value is at a substantially maximum level.

Referring now to FIG. 8, an illustration depicting an embodiment of the H-field distribution 800 of a second type of mobile telephone operating at about 900 MHz is shown. In yet another embodiment, FIG. 9 is an illustration depicting an embodiment of the H-field distribution 900 of a second type of mobile telephone operating at about 1900 MHz. As discussed previously, different mobile telephone designs and different frequency bands may alter the H-field distribution pattern. As a result, design of the receptacle including placement of the one or more patches formed of electromagnetic field reducing material may depend the one or more regions of the mobile telephone in which the SAR value is at an elevated or substantially maximum level.

Figure 10:
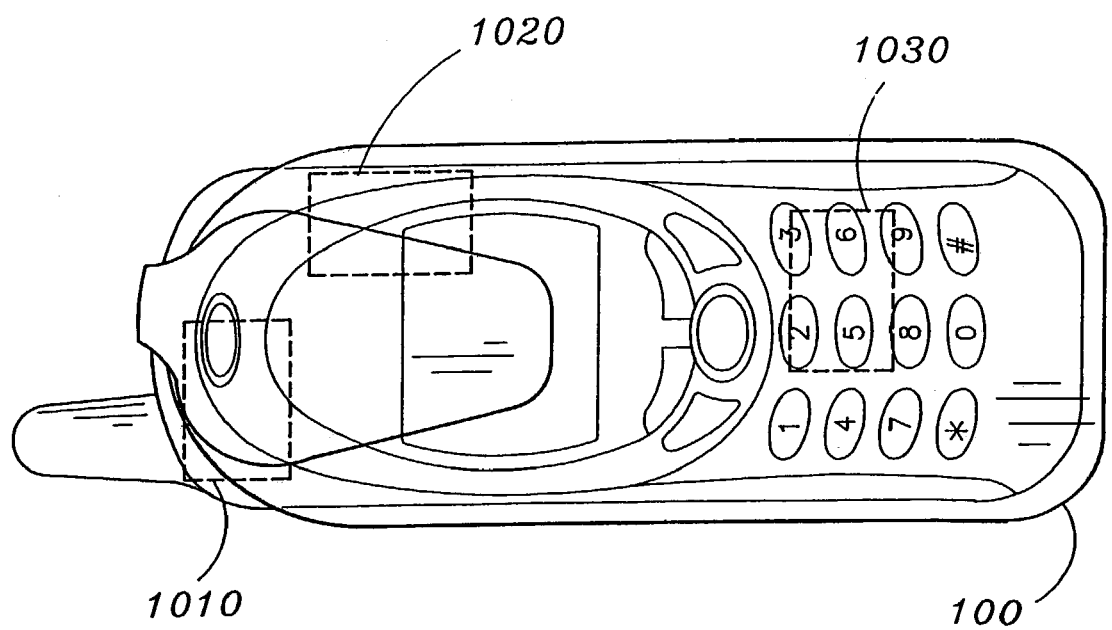
FIG. 10 is an illustration depicting an embodiment of a pouch for securing a mobile telephone, where the pouch includes multiple patches.
Figure 11:
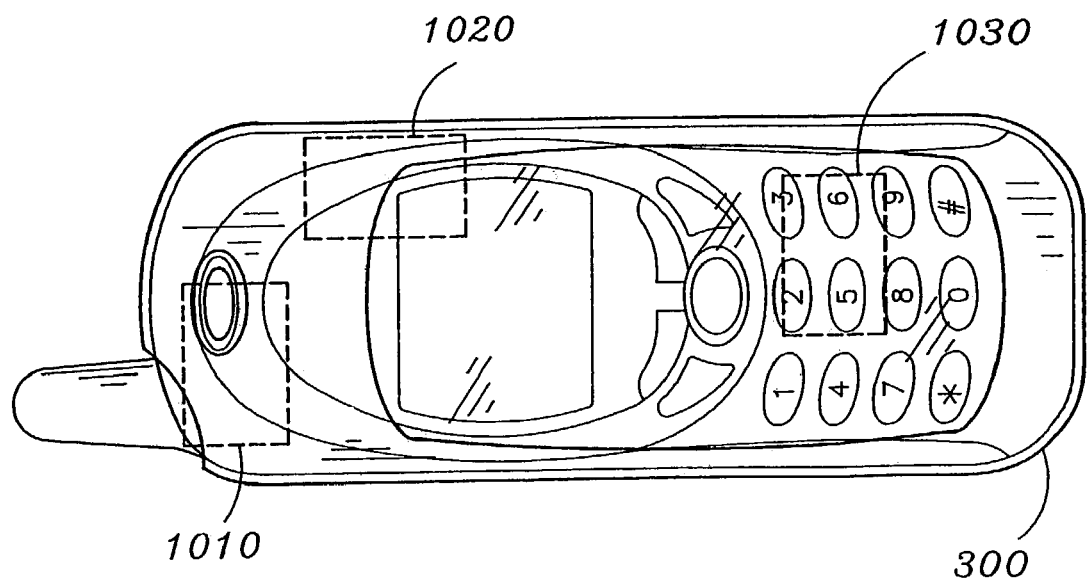
FIG. 11 is an illustration depicting an embodiment of a case for permanently securing a mobile telephone, where the pouch includes multiple patches.

Referring to FIG. 10, an illustration depicting an embodiment of holder comprising a pouch 100 for securing a mobile telephone including multiple patches 1010-1030 is shown. In measuring the H-field distribution of mobile telephones, as shown in FIGS. 5-9, there may be two or more regions of the mobile telephone with elevated or higher SAR values. For example, in one embodiment, a mobile telephone capable of operating in two or more different frequency bands (e.g., 900 MHz and 1900 MHz bands) may have two or more regions where elevated or higher SAR values exist depending on the frequencies at which the mobile telephone is operating. A pouch 100 of the present invention may include two or more patches 1010-1030 for attenuating the two or more regions of the mobile telephone with higher SAR values. Similarly, FIG. 11 is an illustration depicting an embodiment of a case 300 for permanently securing a first type of mobile telephone including multiple patches 1010-1030.

It is contemplated that depending upon the strength of the electromagnetic radiation emitted from one or more regions of the mobile telephone 105, multiple types of electromagnetic field reducing material may be utilized to more efficiently reduce the SAR value of the mobile telephone without hindering performance of the mobile telephone. For example, a first patch 1010 may utilize a dielectric while a second patch 1020 may utilize a metallic material for detuning an antenna of the mobile telephone. Additionally, the thickness of each patch may be adjusted to achieve a desired level of attenuation. For example, a first patch 1010 may be thin for light attenuation where a second patch 1020 may be thick for larger attenuation. It is also contemplated that other types of electromagnetic field reducing material may be utilized to attenuate regions of substantially maximum elevated electromagnetic radiation in accordance with the present invention without departing from the scope and intent of the present invention.

Figure 12:
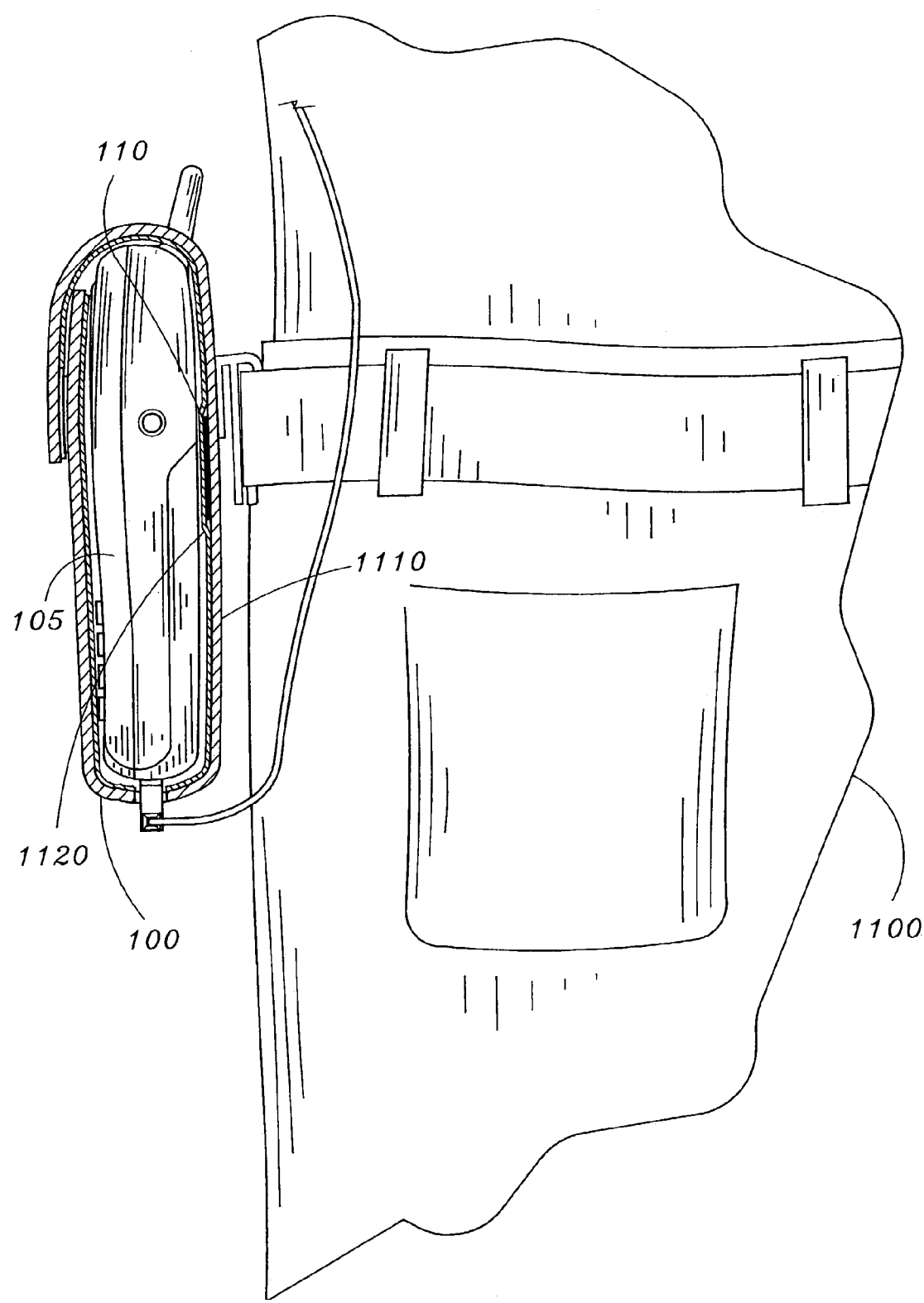
FIG. 12 is an illustration depicting an embodiment of an individual carrying a mobile telephone by a pouch of the present invention.

Referring to FIG. 12, an illustration depicting an embodiment of an individual 1100 carrying a mobile telephone 105 by a pouch 100 of the present invention is shown. Often, an individual 1100 may carry a mobile telephone 105 through use of a mobile telephone receptacle that places the mobile telephone 105 in close proximity to the user's torso. Additionally, the use of a headset in conjunction with a mobile telephone is gaining popularity as a way of remaining in communication with others while removing hand and arm support of the mobile telephone.

As a result, high SAR values may occur to a user that regularly carries the mobile telephone in such a location. An advantageous aspect of the present invention is the ability to effectively reduce the SAR value while preventing unnecessary reduction in performance of the mobile telephone. Current mobile telephones may also provide SAR value resistance when the mobile telephone is placed near one of the ears of an individual, but SAR resistance may not be sufficient when the mobile telephone is stored near the waist of the individual. Advantageously, the mobile telephone receptacle of the present invention may provide additional resistance to SAR during storage on or in proximity to the body of an individual.

Additionally, as shown in FIG. 12, placement of a patch 110 may be between an outer surface 1110 and an inner surface 1120 of the pouch 100. This may be advantageous as it may provide an easy method of installing a patch 110 in a desired location within the pouch 100 during manufacture of the pouch 100. Patch 110 may be attached to the inner surface 1120. Additionally, outer surface 1110 may be an outer cover where the inner surface 1120 may be an inner liner.

Figure 13:
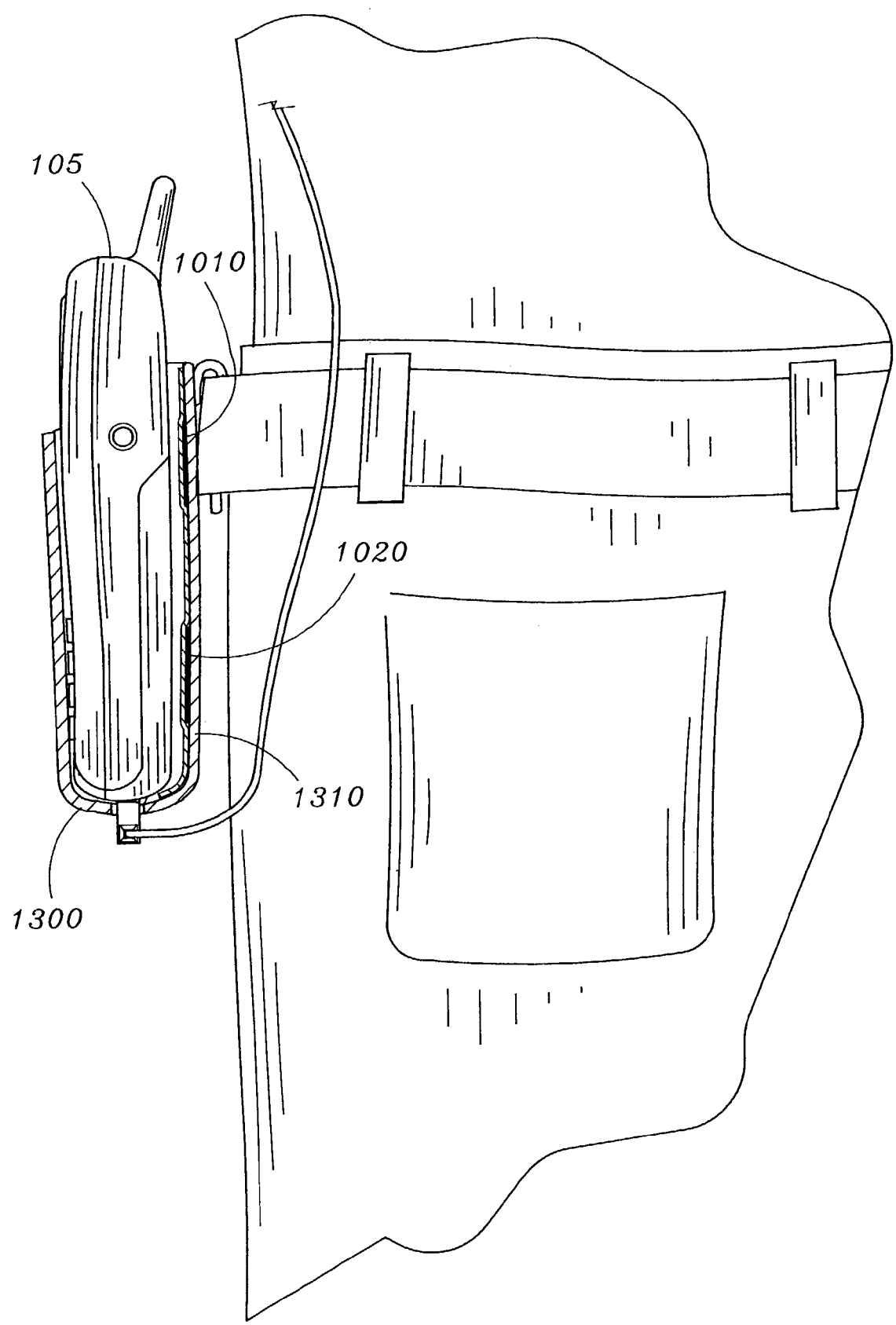
FIG. 13 is an illustration depicting an embodiment of a holster for holding a mobile telephone.

Referring to FIG. 13, an illustration depicting an embodiment of a holster 1300 for securing a mobile telephone 105 is shown. A holster 1300 may be another type of receptacle of the present invention. A holster 1300 may refer to a device that may clip to a belt or other type of clothing and slidably receive a mobile telephone for storage. Typically, a holster 1300 is placed on or around clothing that surrounds the waist of an individual. Holster 1300 may include a wall portion 1310 between the mobile telephone and the body of a user. Wall portion 1310 of holster 1300 may hold one or more patches 1010-1020 formed of electromagnetic field reducing material. Typically, holster 1300 may be formed of a plastic material. Advantageously, patches 1010-1020 may be embedded within the plastic material during manufacture.

In an advantageous aspect of the present invention, receptacles of the present invention may be formed to allow such a device to become universal in nature. For example, patches may be formed on a front and back side of a receptacle so that regardless of the orientation of the mobile telephone within the receptacle, SAR values may be reduced. Additionally, patches may be placed in locations such that a variety of devices may fit within the receptacle and whereby the receptacle is providing mobile telephone SAR value reduction without hindering performance of the mobile telephone.

While FIGS. 1-13 describe the use of a mobile telephone, it is contemplated that any type of mobile communication device including a mobile telephone, pager, wirelessly enabled personal digital assistance (PDA), radio and the like may be utilized in accordance with the receptacle of the present invention without departing from the scope and spirit of the present invention. Additionally, while several embodiments of receptacles including a pouch, case and holster have been disclosed, other types of receptacles for holding a mobile communication device may be utilized by those with ordinary skill in the art without departing from the scope and intent of the present invention.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A holder for a mobile communication device generating a region of substantially maximum elevated electromagnetic radiation, comprising:
    a receptacle for receiving and holding the mobile communication device, said receptacle including a first wall, second wall and third wall, the receptacle comprising a pouch for removably receiving the mobile communication device, the pouch substantially enclosing the mobile communication device when the mobile communication device is received in the receptacle; and
    a patch held in proximity to the region of substantially maximum elevated electromagnetic radiation by the receptacle while the mobile communication device is received in the receptacle for attenuating electromagnetic radiation emitted from the region, said patch being placed only in a portion of said first wall of said receptacle,
    wherein the patch attenuates electromagnetic radiation from the mobile communication device so that the specific absorption rate (SAR) of the mobile communication device is reduced when the mobile communication device is received in the receptacle.

2. The holder as claimed in claim 1, wherein the receptacle is wearable by a user of the mobile communication device so that the mobile communication device is held adjacent to the body of the user for providing body worn use of the mobile communication device.

3. The holder as claimed in claim 2, wherein the receptacle holds the patch between the body of the user and the region of substantially maximum elevated electromagnetic radiation so that the specific absorption rate (SAR) of the mobile communication device is reduced during body worn use of the mobile communication device.

4. The holder as claimed in claim 2, wherein the holder further comprises an attachment to couple the holder to the user.

5. The holder as claimed in claim 1, wherein the pouch comprises an outer surface and an inner surface, the patch being attached to the inner surface so that the patch is held within the pouch.

6. The holder as claimed in claim 1, wherein the pouch comprises an outer cover and an inner liner, the patch being held between the outer cover and the inner liner.

7. The holder as claimed in claim 1, wherein the mobile communication device comprises a keypad and display, and wherein the receptacle comprises a case for removably substantially enclosing the mobile communication device when the mobile communication device is received in the receptacle, the case providing access to at the keypad and display while the mobile communication device.

8. The holder as claimed in claim 7, wherein the case comprises an outer surface and an inner surface, the patch being attached to the inner surface so that the patch is held within the case.

9. The holder as claimed in claim 7, wherein the case comprises an outer cover and an inner liner, the patch being held between the outer cover and the inner liner.

10. The holder as claimed in claim 1, wherein the receptacle comprises a holster for removably receiving the mobile communication device.

11. The holder as claimed in claim 10, wherein the holster comprises a wall portion disposed between the mobile communication device and a body of a user of the mobile communication device, the wall portion holding the patch between the body of the user and the region of substantially maximum elevated electromagnetic radiation.

12. The holder as claimed in claim 1, wherein the patch comprises an electromagnetic field reducing material.

13. The holder as claimed in claim 12, wherein the electromagnetic field reducing material absorbs electromagnetic radiation from the region.

14. The holder as claimed in claim 12, wherein the electromagnetic field reducing material comprises a dielectric material.

15. The holder as claimed in claim 12, wherein the electromagnetic field reducing material comprises a metallic material.

16. The holder as claimed in claim 15, wherein the mobile communication device includes an antenna and the metallic material detunes the antenna.

17. The holder as claimed in claim 12, wherein the electromagnetic field reducing material comprises a magnetic material.

18. A holder for a mobile communication device generating at least a first region of substantially maximum elevated electromagnetic radiation and a second region of substantially maximum elevated electromagnetic radiation, the elevation of electromagnetic radiation of the first region being greater than the elevation of electromagnetic radiation emitted by the second region, the holder comprising:

a receptacle for receiving and holding the mobile communication device, said receptacle including a first wall, second wall and third wall; and a first patch held in proximity to the first region by the receptacle while the mobile communication device is received in the receptacle for attenuating electromagnetic radiation emitted from the first region, said first patch being located only in a portion of said first wall of said receptacle, the first patch comprising first electromagnetic field reducing material;

a second patch held in proximity to the second region by the receptacle while the mobile communication device is received in the receptacle for attenuating electromagnetic radiation emitted from the second region, said second patch being located only in a portion of said first wall of said receptacle, the second patch comprising a second electromagnetic field reducing material, wherein the first patch and the second patch attenuate electromagnetic radiation from the mobile communication device so that the specific absorption rate (SAR) of the mobile communication device is reduced when the mobile communication device is received in the receptacle.

19. The holder as claimed in claim 18, wherein the receptacle is wearable by a user of the mobile communication device so that the mobile communication device is held adjacent to the body of the user for providing body worn use of the mobile communication device.

20. The holder as claimed in claim 19, wherein the receptacle holds the first patch between the body of the user and the first region of substantially maximum elevated electromagnetic radiation and holds the second patch between the body of the user and the second region of substantially maximum elevated electromagnetic radiation so that the specific absorption rate (SAR) of the mobile communication device is reduced during body worn use of the mobile communication device.

21. The holder claimed in claim 18, wherein the receptacle comprises a pouch for removably receiving the mobile communication device, the pouch substantially enclosing the mobile communication device when the mobile communication device is received in the receptacle.

22. The holder as claimed in claim 18, wherein the mobile communication device comprises a keypad and display, and wherein the receptacle comprises a case for substantially enclosing the mobile communication device when the mobile communication device is received in the receptacle, the case providing access to at the keypad and display while the mobile communication device.

23. The holder as claimed in claim 18, wherein the receptacle comprises a holster for removably receiving the mobile communication device.

24. The holder as claimed in claim 18, wherein the first patch comprises a first one of a dielectric material, a metallic material, and a magnetic material, and the second patch comprises a second one of a dielectric material, a metallic material, and a magnetic material.

25. The holder as claimed in claim 18, wherein the first region comprises an antenna and the first electromagnetic field reducing material comprises a metallic material for detuning the antenna, and wherein the second electromagnetic field reducing material comprises a dielectric.

\* \* \* \* \*